(12) United States Patent
Shahar

(10) Patent No.: US 7,433,561 B2
(45) Date of Patent: Oct. 7, 2008

(54) ALL-OPTICAL PHASE, WAVELENGTH, AND POLARIZATION-INSENSITIVE WAVELENGTH CONVERTERS

(76) Inventor: Arie Shahar, 14 David Navon St., P.O. Box 8448, Moshave Magshimim (IL) 56910

( * ) Notice: Subject to any disclaimer, the term of this patent is extended or adjusted under 35 U.S.C. 154(b) by 185 days.

(21) Appl. No.: 11/537,638

(22) Filed: Sep. 30, 2006

(65) Prior Publication Data

US 2007/0286551 A1    Dec. 13, 2007

Related U.S. Application Data

(60) Provisional application No. 60/734,124, filed on Nov. 7, 2005.

(51) Int. Cl.
*G02B 6/26* (2006.01)
(52) U.S. Cl. ....................................................... 385/45
(58) Field of Classification Search .................. 385/122, 385/45, 27, 16, 15; 356/369; 359/326, 332, 359/333
See application file for complete search history.

(56) References Cited

U.S. PATENT DOCUMENTS

| 7,068,894 | B2 | 6/2006 | Prucnal |
| 7,123,401 | B2 | 10/2006 | Shahar et al. |
| 2007/0103684 | A1* | 5/2007 | Shahar ........................ 356/369 |

\* cited by examiner

*Primary Examiner*—Quyen P Leung
(74) *Attorney, Agent, or Firm*—David Pressman

(57) ABSTRACT

An all-optical device for wavelength conversion, reshaping, modulating, and regenerating. The device includes a splitting device having first, second, third, and fourth terminals and a nonlinear element. The third and fourth terminals are associated with an optical loop including the nonlinear element when the nonlinear element is displaced from the mid-point of the optical loop. The splitting device is arranged to receive a modulated signal from one of the first and second terminals and a continuous beam from one of the first and second terminals to generate a patterned signal based on the continuous beam at one of the first and second terminals when the pattern of the patterned signal is inverted with respect to the pattern of the modulated signal.

22 Claims, 2 Drawing Sheets

Figure 1:
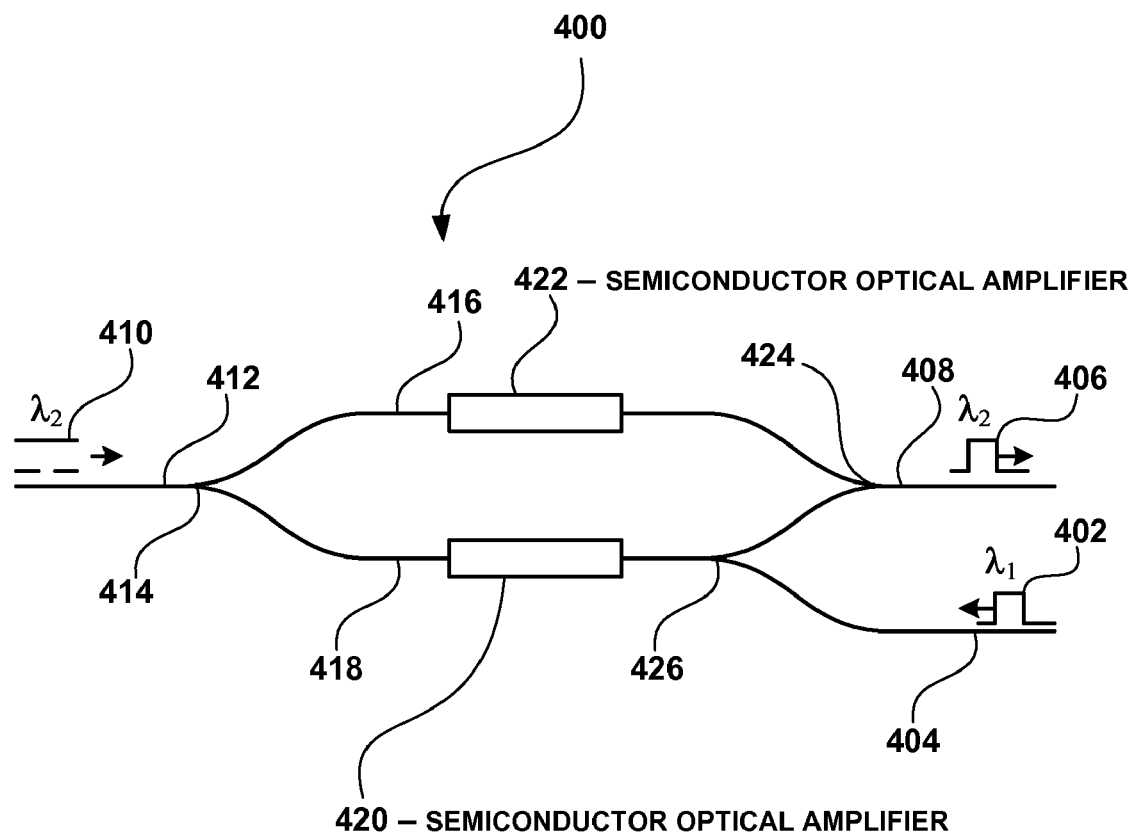

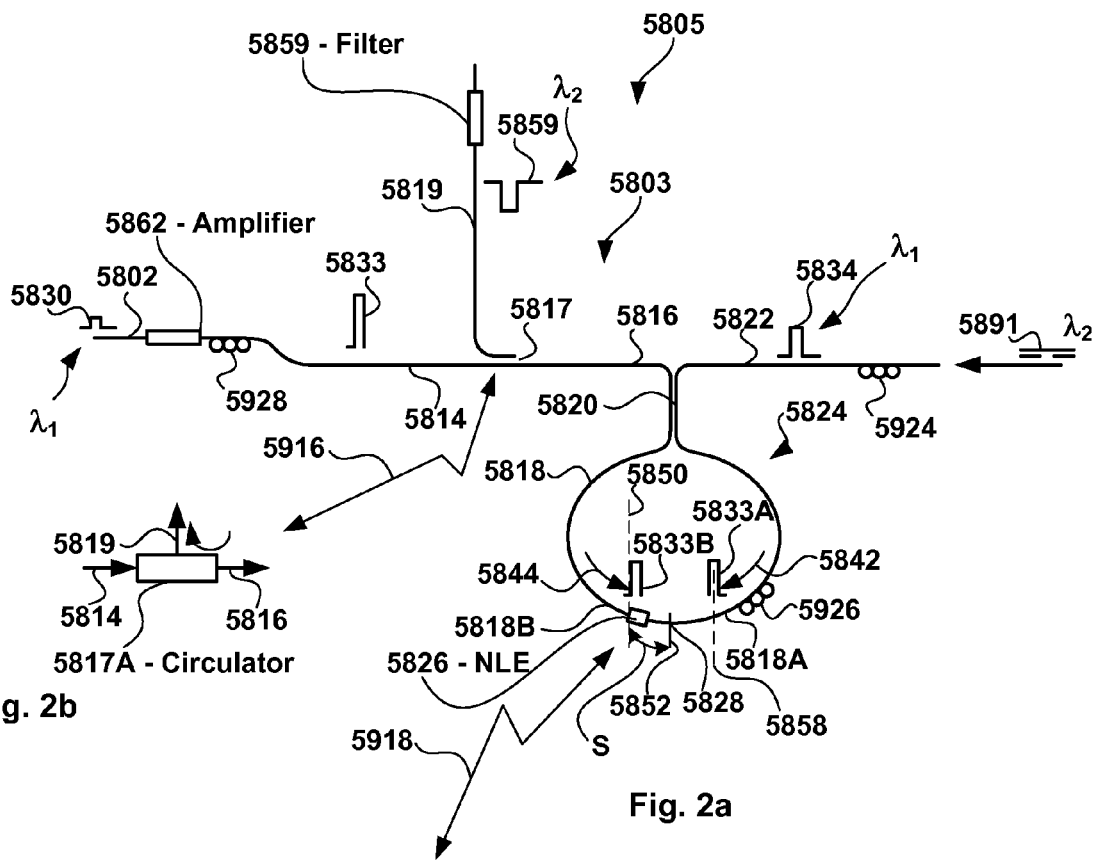
Fig. 2a
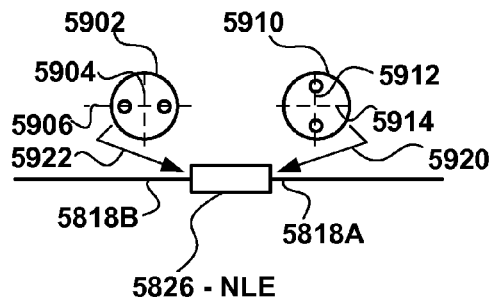
Fig. 2b
Fig. 2c

ALL-OPTICAL PHASE, WAVELENGTH, AND POLARIZATION-INSENSITIVE WAVELENGTH CONVERTERS

CROSS-REFERENCE TO RELATED APPLICATION

This patent issued from an application that claims priority of my provisional patent application Ser. No. 60/734,124, filed Nov. 7, 2005

BACKGROUND

1. Field

Optical communication devices and systems, particularly optical wavelength converters, are used for metro and long-haul communications.

2. Prior Art

The field of optical communication extensively uses Dense Wavelength Division Multiplexing (DWDM) in which a plurality of information channels corresponding to plurality of different wavelengths are inserted, in parallel, into the same optical fiber. Communication systems have a need to transmit information from one channel having a certain wavelength to another channel with another wavelength. In such a situation (channels operate in different wavelengths) there is a need for wavelength converters to allow the transmission of the information from one information channel to another information channel and without the need for Optical-Electrical-Optical (O-E-O) converters.

Wavelength converters may be used also for switching purposes when the wavelength change results with a different port from which the radiation is emitted by wavelength-sensitive demultiplexers (WDM or DWDM).

FIG. 1 is a schematic illustration of a prior-art Mach Zhender Interferometer (MZI) wavelength converter 400. This converter is used to convert signals carried by one wavelength to be carried by another wavelength. Wavelength converters are implemented in the metro area and in the long-haul networks as well. The wavelength converter is designed to convert information generating pulses 402 of wavelength $\lambda_1$, at terminal 404, into converted information pulses 406 of wavelength $\lambda_2$, at terminal 408. Continuous Wave (cw) radiation 410, having a wavelength $\lambda_2$, is inserted at terminal 412 and is split by coupler 414 into cw radiation propagating in branches of radiation guides 416 and 418. The radiation in branched 416 and 418 passes through Solid-state Optical Amplifiers (SOA) 422 and 420, respectively, serving as Non Linear Elements (NLE). SOAs 420 and 422 are adjusted to produce relative phase shifts between the cw radiation in guides 416 and 418 for causing the radiation from guides 416 and 418 to be combined destructively in coupler 424. Accordingly, when no signal 402 is present in terminal 404, there is no output signal 406 at port 408.

When signal 402 having a wavelength $\lambda_1$ is received by terminal 404, it is coupled by coupler 426 into guide 418 and passes through SOA 420. For the time duration in which signal 404 passes through SOA 420, it causes a phase change of π radians to the cw radiation propagating in the opposite direction in SOA 420. In this case the cw radiation from guides 416 and 418 is combined constructively, by coupler 424, to produce pulse 406 at output 408 having a wavelength $\lambda_2$ and a time duration equal to that of pulse 402. Accordingly, converter 400 converts pulses 402 of wavelength $\lambda_1$ at port 404 into similar pulses 406, of wavelength $\lambda_2$, at port 408. The components of the converter of FIG. 1 are well known.

The wavelength converter of FIG. 1 may have one or more of the following disadvantages:

1. The device is phase sensitive and thus electric current injected into SOAs 420 and 422 should be controlled, separately, to each of them to maintain the desired phase relations and to compensate for phase changes resulted from environments changes and/or various drifts in the values of some parameters of device 400, such as gain drifts of SOAs 420 and 422.

2. In the absence of signals 402 at port 404 and in order to produce zero output signals 406 at port 408, there is a need to maintain independent gain and phase relations between amplifiers 422 and 420 at branches 416 and 418, respectively. However the gain and the phase shifts of amplifiers 422 and 420 are dependent parameters, resulting in a situation that may be difficult to control.

3. The design of the device requires two SOAs which may reduce manufacturing yield and may increase manufacturing cost and complexity.

U.S. patent application Ser. No. 10/845,149 entitled "All optical phase insensitive wavelength converters, apparatus systems and methods" filed May 14, 2004" by Arie Shahar et al. and published Nov. 25, 2004 as Publication Nr. 20040233513 shows a wavelength converter which has one or more of the following drawbacks:

1. It is sensitive to the polarization orientation of the converted signal.

2. It includes an attenuator in its optical loop that attenuates the converted signal.

International patent application PCT/US2004/028588 (International Publication Number WO 2005/022706 A2) by Paul R. Prucnal, filed Sep. 2, 2004 (priority date of Sep. 2, 2003—U.S. Ser. No. 60/499,536) discloses a wavelength converter that suffers from the following disadvantages:

1. The device is polarization sensitive.
2. The device suffers from high loss due to a coupler in its optical loop. This coupler should have a high coupling coefficient to efficiently couple the converted signal into the optical loop in order to have enough power to produce polarization rotation in the Non Linear Element (NLE) of the optical loop. This means that that the loss in the optical loop is at least equal to the high coupling ratio of the above mentioned coupler.
3. The device suffers from high pattern distortion due to the high power of the converted signal injected from one side only into the NLE in the optical loop.
4. The device suffers from high gain instability due to the high power converted signal that causes the gain of the NLE to be pattern dependent.

ADVANTAGES

Some advantages of some exemplary embodiments are to provide phase and polarization insensitive wavelength converters, to provide wavelength converters or a regenerator that does not suffers from attenuating devices such as attenuator or coupler in its optical loop, to provide wavelength converters that require only one Non Linear Element, to provide optical re-shapers and regenerators in which a cw beam and a generating signal have the same wavelength, to provide optical modulators to convert direct modulated signals into low chirp signals, to provide a wavelength converter that does not suffer from the above listed disadvantages of the devices of the above Prucnal and Shahar et al. applications.

SUMMARY

In one embodiment, an all-optical device provides wavelength conversion, reshaping, modulating and regenerating. The device includes a splitting device having first, second, third, and fourth terminals and a nonlinear element. The third and fourth terminals are associated with an optical loop including the nonlinear element when the nonlinear element is displaced from the mid-point of the optical loop. The splitting device is arranged to receive a modulated signal from one of the first and second terminals and a continuous beam from one of the first and second terminals to generate a patterned signal based on the continuous beam at one of the first and second terminals when the pattern of the patterned signal is inverted with respect to the pattern of the modulated signal.

DRAWINGS

FIG. 1 is a schematic illustration of a wavelength converter known in the art that is phase sensitive and includes two Non Linear Elements (NLEs);

FIGS. 2a, 2b, and 2c illustrate a polarization insensitive wavelength converter with no excess loss in its optical loop.

ABBREVIATIONS AND SYMBOLS

ASE—Amplified Spontaneous Emission

CCW—Counterclockwise

CW—Clockwise cw—Continuous Wave

DWDM—Dense Wavelength Division Multiplexing

EDFA—Erbium Doped Fiber Amplifier

LOA—Linear Optical Amplifier

MZI—Mach Zhender Interferometer

NLE—Non Linear Element

O-E-O—Optical-Electrical-Optical

PLC—Planar Circuits

PM—Polarization Maintaining

PMD—Polarization Mode Dispersions

PMF—Polarization Maintaining Fibers

S—Distance

SMF—Single Mode Fibers

SOA—Semiconductor Optical Amplifier

XGM—Cross Gain Modulation

λ—Wavelength

DETAILED DESCRIPTION

FIG. 2a

FIG. 2a illustrates a wavelength converter. Unlike the devices disclosed by the above Shahar et al. whose principle of operation is based mainly on the phase shift that the converted signal creates at the NLE in the optical loop, the principle of operation of the device of FIG. 2a, as explained below, is mainly based upon the polarization rotation that the converted signal creates at NLE 5826.

The device of FIG. 2a includes coupler 5820 having input terminal 5802 and output terminal 5822. The other two terminals of coupler 5820 form optical loop 5818 having nonlinear element 5826. Input terminal 5802 includes directing device 5817 that its terminal 5819 may include optional filter 5859. Output terminal 5822, optical loop 5818 and input terminal 5802 may include optional polarization controllers 5924, 5926 and 5928, respectively.

PRINCIPLE OF OPERATION

(a) Polarization Sensitive Wavelength Converter

First I will provide an explanation of a situation when there is no arrangement to make the device of FIG. 2a. A polarization insensitive device is used when the device is constructed from radiation guides that are not polarization maintaining, such as Single Mode Fibers (SMF). Polarization controllers 5924 and 5926 are adjusted to produce the desired polarization orientation. Under the condition of the desired polarization orientation when no signal 5830 is present at port 5802, cw radiation 5891, having wavelength $\lambda_2$ and arriving to loop 5818 from terminal 5822, is transmitted, at least in part, into terminal 5816 and is coupled from guide 5816, by directing device 5817 (illustrated as coupler 5817), to port 5819 to be emitted out of the converter via optional filter 5859. The injection current into NLE 5826 may also be adjusted to produce optimal polarization rotation in order to maximize the power of cw beam 5891 at port 5819.

Beam 5891 (cw) is split by a splitting device (coupler 5820) into two optical components propagating clockwise (CW) and counterclockwise CCW) in loop 5818. When the CW and the CCW components complete their propagation along loop 5818 they return to coupler 5820 to recombine there by interference. The phase shifts of the CW and CCW optical components produced by the propagation along loop 5818 are equal. Accordingly, if the radiation guides of loop 5818 and NLE 5826 do not produce any polarization rotation, the whole energy of cw beam 5891 would be reflected back into terminal 5822 by a complete constructive interference between the CW and CCW components at coupler 5820.

Polarization Conditions for Continuous Beam

However, when varying the polarization orientation, by polarization controller 5926 and NLE 5826, at least part of the energy of beam 5891 can be emitted out from loop 5818 via coupler 5820 and into radiation guide 5816. This process is possible since the polarization rotation is not a reciprocal process and the polarization rotation for the CW component is not equal to the polarization rotation for the CCW component. This means that the polarization orientations of the CW and the CCW components returning in loop 5818 to coupler 5820 may be adjusted by the injection current to NLE 5826 and polarization controller 5926 to be in different orientations. In such a case, at least part of the energy of cw beam 5891 is transmitted to guide 5816 via loop 5818 and coupler 5820. The polarization of the CW and CCW components may even be adjusted, by NLE 5826 and controller 5926, to be oriented in opposite directions. In such a case, the CW and CCW components interfere completely destructively at coupler 5820 and the whole energy of cw beam 5891 is transmitted from port 5822 to guide 5816.

Influence of Probe Signal

A generating signal (known also as converted signal, probe signal or control signal) 5830 appears as signal 5833 in guide 5614 after being amplified by optional optical amplifier 5862, which may be an SOA. The intensity of signal 5833 is above the power level needed to produce a significant polarization rotation at NLE 5826. Generating signal 5830, arriving at guide 5814 as signal 5833, propagates from there, via a directing device (coupler) 5817, to radiation guide 5816 and device 5824 that includes splitting device (coupler) 5820 and loop 5818. At least part of generating signal 5830 is transmitted, by device 5824, to port 5822 and appears at port 5822 as signal 5834 having wavelength $\lambda_1$. Generating signal 5830, arriving to directional coupler 5820 as signal 5833, is split into two optical components 5833A and 5833B propagating CW and CCW in the directions of arrows 5842 and 5844, respectively, in optical loop 5818. If coupler 5820 is a symmetric coupler, components 5833A and 5833B have equal intensity.

When generating signal 5830 is present at port 5802 it changes the polarization rotation of NLE 5826 by the high power induced to NLE 5826 from components 5833A and 5833B produced by signal 5830. Components 5833A and 5833B propagating in the direction of arrows 5842 and 5844, respectively, may also cause Cross Gain Modulation (XGM) and phase shift in NLE 5826, however, the main effect that they produce in NLE 5826 is the relative change of the polarization rotation that NLE 5826 cause to CW and CCW components of cw beam 5891. This relative change in the polarization orientation for the CW and CCW components of cw beam 5891 is caused, as explained above, due to the non-reciprocal process that produces different polarization rotation to these components during their travel in loop 5818. The relative polarization rotation applied by NLE 5826 to the CW and CCW components may be adjusted by the power of converted signal 5830 and its components 5833A and 5833B. This induces in NLE 5826 a polarization rotation that will cause the CW and CCW components of cw beam 5891 to return to coupler 5820 of loop 5826 with polarization orientations that are opposite. In this case, the CW and CCW of beam 5891 interfere completely constructively in coupler 5820 and thus cw beam 5891 is completely reflected back into port 5822 and no cw beam 5891 appears at port 5819.

Displacement of Nonlinear Element from Mid Point of Optical Loop

The absence of signal 5891 at port 5819 lasts for the time period that components 5833A and 5833B pass through NLE 5826. NLE 5826 is displaced by distance S from midpoint 5828. Displacement S is defined as the distance between midpoint 5828 of loop 5818 and the edge of NLE 5826 marked by line 5850. As will be explained below, distance S is relatively small and thus components 5833A and 5833B pass through NLE 5826 at substantially the same time. This means that the absence of signal 5891, having wavelength $\lambda_2$, at port 5819 lasts for a time period that is substantially equal to the time width of signal 5830 as shown by signal 5859 at port 5819.

Accordingly, signal 5859 at port 5819 is the inverted signal of generating signal 5830. However while signal 5830 at port 5802 has a wavelength $\lambda_1$ inverted signal 5859 at port 5819 has a wavelength $\lambda_2$. This means that device 5802 operates as inverted wavelength converter.

As explained above, cw beam 5891 (like converted beam 5830) is also split into CW and CCW optical components at loop 5818. When NLE 5826 is displaced by a distance S from midpoint 5828, optical components 5833A and 5833B change the polarization orientation of the CW and CCW optical components of cw beam 5891 when they pass through NLE 5826 located asymmetrically in loop 5818. Thus these CW and CCW components of cw beam 5891 are at a different distance from coupler 5820 where they recombine. The change in the polarization orientation at NLE 5826 and the difference in the distances from NLE 5826 to coupler 5820 for the CW and CCW components of cw beam 5891 cause these CW and CCW components to be combined, by interference, at coupler 5820 with different polarization orientation.

The difference between the polarization orientation of the CW and CCW components that experience the change of the polarization orientation at NLE 5826, due to the generating signal (components 5833A and 5833B), may vary periodically at coupler 5820 where the CW and CCW components interfere. This periodic change in the relative polarization orientation between the CW and CCW components of beam 5891 is a function of the displacement distance S. This periodic change is actually the beat length of the birefringence of the radiation guides in loop 5818, which can be in the range of few millimeters. Thus the displacement S may be equal or smaller than the above beat length or equal to this displacement with the additional length of an integral number of times the beat length.

Accordingly, in the presence of generating signal 5830 at port 5802, distance S may be adjusted to create relative polarization orientation of $\pi$ radians between the CW and CCW components of beam 5891 at loop 5818 for reducing the power of signal 5859 at port 5819 to substantially zero. This adjustment can improve dramatically the extinction ratio of wavelength converter 5803. Adjusting the above mentioned distance S of the displacement of NLE 5826 to its optimal distance makes the wavelength converter more efficient and allows the power of generating signal 5830 to be reduced.

Wavelength Converter with High Conversion Efficiency and Reduced Pattern Distortions The reduction of the power of signal 5830 reduces the XGM at NLE 5826 as well. This enables inverted signal 5859 to be generated with little delay in the recovery time of NLE 5826. This allows a high quality converted and inverted signal 5859 to be generated that is pattern insensitive. The efficiency of the wavelength conversion of device 5805 is increased with the birefringence of NLE 5826. When NLE 5826 has high birefringence, the difference between the indices of refraction of its fast axis and slow axis is high. In this case, NLE 5826 may produce a large change between the polarization orientation of the CW and CCW signals propagating in optical loop 5818. Accordingly, when NLE 5826 has high birefringence, it may produce a polarization change between the CW and CCW signals propagating in loop 5818, which is needed for the wavelength conversion even when generating signal 5830 has relatively low intensity.

This beat length is equivalent to time delay of 10-30 picoseconds (depends on the birefringence of the radiation guides of loop 5818). Thus, when displacement S is equal or smaller than the beat length, the delay time between the arrival time of components 5833A and 5833B to NLE 5826 is equal or smaller than 10-30 picoseconds and thus can be regarded, as mentioned above, as passing substantially at the same time through NLE 5826. The entrance of components 5833A and 5833B to NLE 5826 at substantially the same time from two opposite orientations eliminates the pattern distortion exists in the device disclosed by above Prucnal application.

Low-Loss Wavelength Converter

Another major disadvantage of high loss in the Prucnal device is eliminated by device 5803 by eliminating the need to couple the generating signal into loop 5818 using additional coupler that is integrated into loop 5818. As mentioned above, such a coupler should have a high coupling efficiency to maintain the high power of the converted signal at the NLE for producing the necessary polarization rotation. However the excess loss that such coupler produces are at least equal to its coupling efficiency and are very high. That means that the device disclosed by Prucnal application suffers from high loss that does not exist in the converter of FIG. 2*a*.

The low loss in this device is also a significant advantage over the device disclosed by the Shahar et al. application, which includes an attenuator in its optical loop and produces a major loss for the converted signal.

FIG. 2*b* shows circulator 5817A having input port 5814, output port 5816 and returning port 5819. Circulator 5817A may be used as the directing device of the converter of FIG. 2*a* by replacing coupler 5817 of the converter.

Further reduction in the loss may be achieved by replacing coupler 5817 by circulator 5817A as indicated by arrows 5916 and shown in FIG. 2*b*. Circulator 5817A is coupled to guides 5814, 5816 and 5819 of FIG. 2*a* to replace coupler 5817. Unlike coupler 5817, circulator 5817A allows almost complete transmission of generating signal 5833 from guide 5814 to guide 5816 and at the same time it allows almost complete transmission of signal 5891 from guide 5816 to guide 5819 as well.

(b) Polarization Insensitive Wavelength Converter

FIG. 2*c* shows nonlinear element 5826 of FIG. 2*a* coupled to polarization maintaining fibers 5818A and 5818B of optical loop 5818 in a configuration when the fast axis of fiber 5818A is aligned towards the slow axis of fiber 5818B.

In order to make the wavelength converter of FIG. 2*a* polarization insensitive, at least the radiation guides of loop 5818 and coupler 5820 should maintain polarization. For example, FIG. 2*c* shows radiation guides 5818A and 5818B of loop 5818 of FIG. 2*a* that are Polarization Maintaining Fibers (PMF). PMF 5818A and 5818B are shown in cross-sections 5910 and 5902 and have fast axes 5914 and 5904 and slow axes 5912 and 5906, respectively.

PMF fibers 5818A and 5818B are coupled to NLE 5826 of FIGS. 2*a* and 2*c* as indicated by arrows 5920 and 5922, respectively. Arrows 5920 and 5922 show the coupling points where PMF fibers 5818A and 5818B are coupled to NLE 5826. From cross-sections 5910 and 5902, it can be seen that PMFs 5818A and 5818B are oriented orthogonally to each other.

In this situation, when coupler 5820 is a Polarization Maintaining (PM) coupler, fibers 5818A and 5818B are PM fibers that are oriented orthogonally to each other, and displacement S is small, the NLE will receive optical components 5833A and 5833B in polarization orientations that are substantially orthogonal to each other.

The fact that for any polarization orientation of generating signal 5830, its components 5833A and 5833B will arrive to NLE 5826 in loop 5818 with polarization orientations that are orthogonal to each other makes wavelength converter 5803 polarization insensitive to generating signal 5830. In this case polarization controllers 5926 and 5928 are not needed and can be removed from device 5803 of FIG. 2*a*.

Polarization Insensitive Wavelength Converter with Reduced Polarization Mode Dispersions The configuration in which PMFs 5833A and 5833B are orthogonal causes the signal from fast axis 5914 of PMF 5818A to be coupled to slow axis 5906 of PMF 5818B and vice versa. Similarly, the signal from slow axis 5912 of PMF 5818A is coupled to fast axis 5904 of PMF 5818B and vice versa. Since the length of PMF 5818A and 5818B is similar, the traveling distance that each signal propagates in the fast and the slow axes is similar. Accordingly, the above mentioned configuration has the advantage of reducing the Polarization Mode Dispersions (PMD).

Polarization controller 5924 may be removed from device 5803 of FIG. 2*a* as well, provided that the polarization of signal 5891 will be aligned to its optimal orientation. This orientation does not change since unlike the converted signal that has random polarization orientation, the light source of signal 5891 has a fixed polarization orientation.

Polarization Insensitive Wavelength Converter with Improved Gain Stability

To improve the gain stability of device 5803 of FIG. 2*a*, optional optical amplifier 5802 may be a Semiconductor Optical Amplifier (SOA). SOAs are known for their relatively high Amplified Spontaneous Emission (ASE). Accordingly, the use of an SOA may help to achieve constant average power at NLE 5826, which is independent on the pattern. Adjusting the current injected to SOA 5802 controls the amount of ASE emitted from SOA 5802 and may produce constant average power at NLE 5826 which is independent on the pattern of generating signal 5830. Such a fixed average power at NLE 5826 make device 5803 very stable and it does not suffers from gain instabilities due to pattern variations of generating signal 5830.

CONCLUSIONS, RAMIFICATIONS, SCOPE

Wavelength converter 5803 of FIGS. 2*a*-2*c* has one or more of the following additional advantages over the devices disclosed by the Prucnal and Shahar et al. applications:

1. The device is polarization insensitive.
2. The device has an optical loop without an attenuator.
3. The device has very low loss due to the elimination of the need to couple the generating signal into the loop using additional directional coupler.
4. The device does not suffer from high pattern distortion due to the injection of the signal into NLE 5626, through its both sides, in a collision mode.
5. The device is very stable and does not suffer from high gain instability due to substantially fixed average power at NLE 5826 achieved by the adjustment of the ASE of pre-amplifier 5802.

As explained above, the device of FIG. 2*a* is phase and polarization insensitive. In a situation where coupler 5820 and directing device 5817 are also wavelength insensitive, the whole device 5805 is wavelength insensitive.

While certain features have been illustrated and described, many modifications, substitutions, changes, and equivalents may occur to those of ordinary skill in the art.

All the embodiments may include optical isolators in their inputs through which the cw radiation and the pattern of the generating signals are coupled into the wavelength converters. Such optical isolators may block the back reflection and the return of cw radiation and or pulses back into the sources of the cw radiation and the generating signals.

All the embodiments may include a continuous sequence of optical components connected by light-guiding media such as, for example, optical fibers, planar waveguides, or planar circuits (PLC), which media may be fabricated using integrated optic techniques and/or on-chip manufacturing. Alternatively, All the embodiments may be constructed from discrete components, in which case the optical guiding media may be replaced by open (free) space, e.g., vacuum, or by a non-solid, e.g., gaseous media, and the directional couplers may be replaced with beam splitters. It should be understood that all amplifiers and controllers may include variable and/or adjustable components. All amplifiers may be made of amplifying media and devices and in particular are made of SOAs, Linear Optical Amplifiers (LOAs) and Erbium-Doped Fiber Amplifier (EDFAs).

While the embodiments are described as wavelength converters operate by copying the pulse-pattern signal from one modulated wavelength $\lambda_1$ into another Continuous Wave (cw) having another wavelength $\lambda_2$, the embodiments may operate in a similar manner when the modulated signal and the cw beam have the same wavelength $\lambda_1=\lambda_2$. When $\lambda_1=\lambda_2$ the embodiments operate as optical shapers and 2R regenerators by copying the modulated signal onto a cw beam having the same wavelength at the modulated signal for reshaping and regenerating a new signal with a better quality. Accordingly, it should be understood that all the embodiments are devices that operate under various conditions when either $\lambda_1=\lambda_2$ or $\lambda_1 \neq \lambda_2$ and in any place that symbols $\lambda_1$ and $\lambda_2$ are used they may be different wavelengths or the same wavelength. All the embodiments may operate as modulators as well when receiving direct modulated pulses with chirp and converting them, by copying on a cw beam, into pulses with reduced or no chirp.

Therefore the appended claims are intended to cover all such modifications and changes as fall within the true spirit of the embodiments discussed and their legal equivalents.

The invention claimed is:

1. An all optical device for wavelength conversion, reshaping, modulating, and regenerating, comprising:
   a splitting device having first, second, third, and fourth terminals;
   a nonlinear element; and
   an optical loop including said nonlinear element, said optical loop having a midpoint,
   said third and fourth terminals being associated with said optical loop,
   said nonlinear element being displaced from said midpoint of said optical loop,
   said splitting device being arranged to receive from one of said first and second terminals a modulated signal having a pattern and a continuous beam from one of said first and second terminals and arranged to generate a patterned signal based upon said continuous beam, and
   said splitting device being arranged to generate said patterned signal so that its pattern is inverted with respect to said pattern of said modulated signal.

2. The device of claim 1 wherein said non linear element is displaced from said midpoint of said optical loop by a distance that is equal or smaller than the beat length of the birefringence of the radiation guides that construct said optical loop.

3. The device of claim 1 wherein said splitting device and said optical loop are polarization-maintaining components having fast and slow axes to produce birefringence having a beat length.

4. The device of claim 3 wherein said nonlinear element is displaced from said midpoint of said optical loop by a distance that is equal or smaller than the beat length of said birefringence of said optical loop with the additional length of an integral number of times said beat length.

5. The device of claim 1 wherein said splitting device is a polarization maintaining splitter and said optical loop includes a plurality of polarization-maintaining radiation guides.

6. The device of claim 5 wherein said polarization-maintaining splitter and said radiation guides of said optical loop each has a fast axis and a slow axis.

7. The device of claim 6 wherein said optical loop includes a plurality of polarization-maintaining radiation guides, wherein the fast axis of one of said polarization-maintaining radiation guides that is coupled to one side of said nonlinear element is aligned to the slow axis of the other polarization maintaining radiation guides that is coupled to the other side of said nonlinear element.

8. The device of claim 1 wherein said one of said first and second terminals further includes a directing device.

9. The device of claim 8 wherein said directing device is a circulator.

10. The device of claim 8 wherein said directing device is a coupler.

11. The device of claim 8 wherein said directing device is associated with a filter.

12. The device of claim 1 wherein said one of said first and second terminals further includes an optical amplifier.

13. The device of claim 12 wherein said optical amplifier is a semiconductor optical amplifier.

14. The device of claim 13 wherein said injection current to said semiconductor optical amplifier is controlled to adjust the amount of amplified spontaneous emission produced by said semiconductor optical amplifier for reducing the gain instabilities of said nonlinear element.

15. The device of claim 1 wherein said optical loop includes a polarization controller.

16. The device of claim 1 wherein one of said first and second terminals includes a polarization controller.

17. The device of claim 1 wherein said nonlinear element is a solid-state optical amplifier.

18. The device of claim 16 wherein said solid-state optical amplifier has high birefringence.

19. The device of claim 1 wherein said modulated signal and said continuous beam have different wavelengths.

20. The device of claim 1 wherein said device is a wavelength converter.

21. The device of claim 1 wherein said modulated signal and said continuous beam have the same wavelength and wherein said device is an optical regenerator.

22. The device of claim 1 wherein said splitting device splits said modulated signal into two modulated signals counter propagating in said optical loop for reducing gain distortions of said patterned signal.

* * * * *